United States Patent
Morlok et al.

(10) Patent No.: US 12,327,958 B2
(45) Date of Patent: Jun. 10, 2025

(54) CONNECTION ASSEMBLY

(71) Applicants: H & B Electronic Gmbh & Co. KG, Deckenpfronn (DE); Fraunhofer-Gesellschaft zur Förderung der angewandten Forschung e.V., Munich (DE)

(72) Inventors: Tobias Morlok, Mötzingen (DE); Jan Bayerbach, Calw (DE); Bernhard Brunner, Erlabrunn (DE)

(73) Assignees: H & B ELECTRONIC GMBH & CO. KG, Deckenpfronn (DE); FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 467 days.

(21) Appl. No.: 17/860,793

(22) Filed: Jul. 8, 2022

(65) Prior Publication Data

US 2023/0021030 A1 Jan. 19, 2023

(30) Foreign Application Priority Data

Jul. 16, 2021 (DE) .......................... 102021118460.6

(51) Int. Cl.
*H01R 13/00* (2006.01)
*H01R 4/72* (2006.01)
(Continued)

(52) U.S. Cl.
CPC .......... *H01R 13/6683* (2013.01); *H01R 4/72* (2013.01); *H01R 13/502* (2013.01); *H01R 13/5825* (2013.01); *H01R 13/6581* (2013.01)

(58) Field of Classification Search
CPC ..... H01R 13/6683; H01R 4/72; H01R 13/502
See application file for complete search history.

(56) References Cited

U.S. PATENT DOCUMENTS

| 9,972,930 | B1 * | 5/2018 | Skepnek | H01R 12/772 |
| 11,637,437 | B2 * | 4/2023 | Al-Ali | A61B 5/1455 |
| | | | | 320/107 |

(Continued)

FOREIGN PATENT DOCUMENTS

| CN | 212725632 U | 3/2021 |
| DE | 10 2017 207 142 A1 | 10/2016 |

(Continued)

*Primary Examiner* — Phuong Chi Thi Nguyen
(74) *Attorney, Agent, or Firm* — Birch, Stewart, Kolasch & Birch, LLP

(57) ABSTRACT

A connection assembly for the electrical and mechanical connection between a contact electrode and an electrical conductor element has a flexible sensor/electrode section in which the contact electrode is at least partially arranged. The connection assembly has at least one electrical inner conductor of the electrical conductor element for applying and/or removing an electrical voltage and/or capacitive change at the contact electrode. An electrical contact region is provided in which the at least one electrical inner conductor makes electrical contact with the contact electrode of the sensor. A connecting device is provided which can be prestressed against the contact electrode of the sensor in the contact region, with interposition of the inner conductor.

19 Claims, 5 Drawing Sheets

Figure 1:
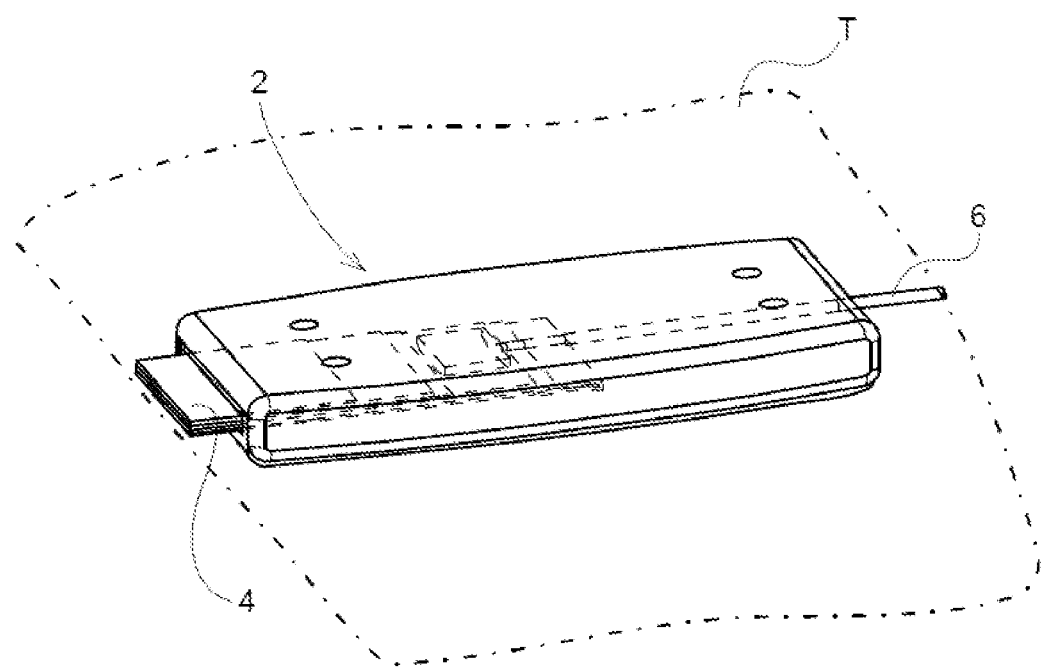

(51) Int. Cl.
*H01R 13/502* (2006.01)
*H01R 13/58* (2006.01)
*H01R 13/6581* (2011.01)
*H01R 13/66* (2006.01)

(56) References Cited

U.S. PATENT DOCUMENTS

| | | | |
|---|---|---|---|
| 11,825,536 B2 * | 11/2023 | Al-Ali | A61B 5/14551 |
| 11,886,858 B2 * | 1/2024 | Housel | G16H 40/20 |
| 12,016,721 B2 * | 6/2024 | Telfort | A61B 7/04 |
| 12,126,683 B2 * | 10/2024 | Koo | H04W 4/38 |
| 2020/0113498 A1 | 4/2020 | Scruggs et al. | |

FOREIGN PATENT DOCUMENTS

| | | |
|---|---|---|
| DE | 10 2015 013 490 A1 | 4/2017 |
| EP | 2 100 779 A1 | 9/2009 |
| EP | 2 698 616 A2 | 2/2014 |
| EP | 3 282 218 A1 | 2/2018 |
| EP | 3 540 858 A1 | 9/2019 |

\* cited by examiner

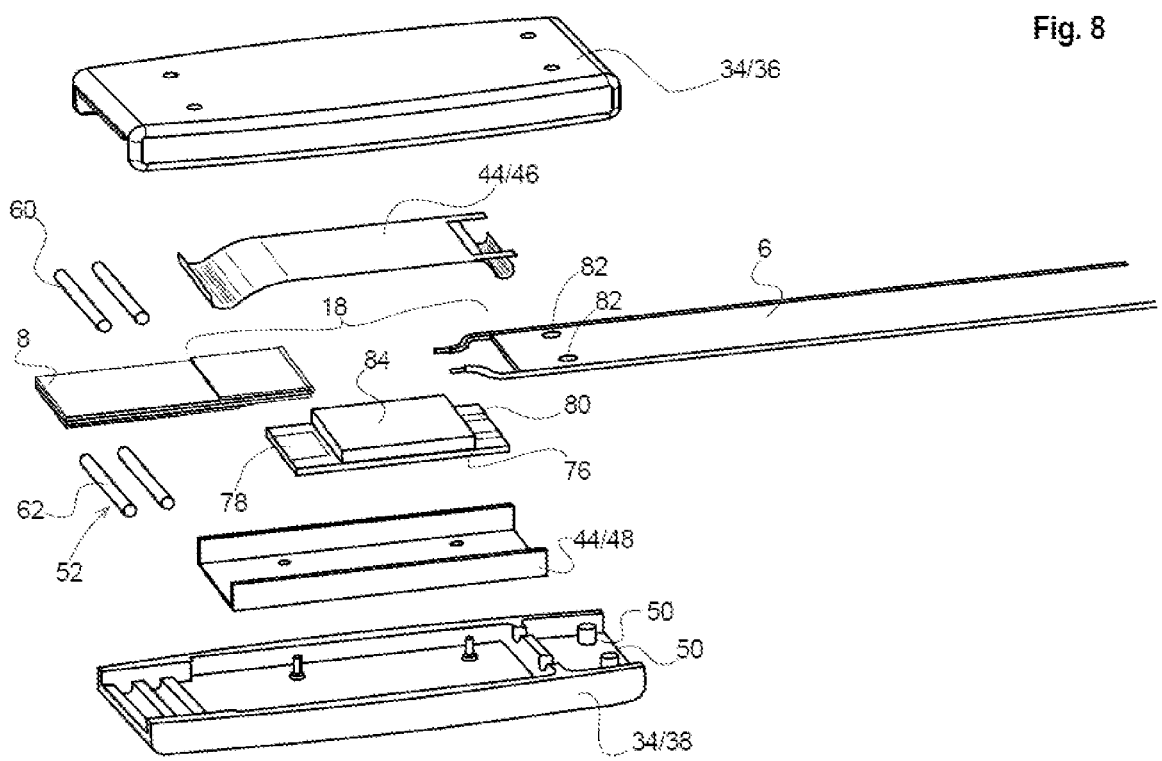

CONNECTION ASSEMBLY

The invention relates to a connection assembly for the electrical and mechanical connection between a contact electrode to be contacted, which is formed for example by a flexible or elastic electrode of a sensor or of a temperature control device or of a heating device, and an electrical conductor element with one or more electrical cables, a bus conductor, an assembly of electrical threads, an electrically conductive film, or the like, according to the preamble of claim 1; the invention also relates to a connecting device for producing such a connection assembly. The connection assembly in this case has a flexible or elastic sensor/electrode section, in which the at least one contact electrode is at least partially arranged, as well as at least one electrical inner conductor of the electrical conductor element which is used for applying and/or removing an electrical voltage and/or capacitive change to or from the contact electrode. Furthermore, an electrical contact region is provided in which the at least one electrical inner conductor of the conductor element or of the bus conductor makes electrical contact with the contact electrode of the sensor.

Such connection assemblies are required, for example, to connect dielectric elastomer sensors, which have an expandable and/or volume-compressible film or layer, acting as a dielectric, between two electrodes, or flexible or elastically deformable temperature control devices, such as, in particular, electrical heating elements, to a cable-shaped or bus-shaped conductor. The conductor in this case can be used to connect to another electrical/electronic component, such as an evaluation unit, an optical, acoustic, and/or tactile output unit, and/or a voltage source or power supply. Such dielectric elastomer sensors or temperature control devices are provided or attached or sewn to textile materials, for example. In particular, these can be part of a functional item of clothing, a pair of underwear, a curtain, or another textile or article of daily use with a sensitive surface and a specific function. For example, the respective sensor system can serve to monitor bodily functions of a user or to determine specific material loads. Furthermore, the connection assembly can be used in the manner of a switch or activator for transmitting a signal as a function of a determined load or stress that occurs on the textile carrier material.

EP2698616A2 discloses a flat, volume-compressible, capacitive sensor for measuring pressure and/or for measuring or detecting deformations. In order to apply voltages or measure currents between the electrodes for the purpose of a capacitance measurement, a metal wire connection with a corresponding electrical device is provided thereon. As an alternative thereto, a capacitance measurement can also take place wirelessly, for which purpose one or more transponders can be provided in the sensor.

The problem with the known metal wire connections is that permanent electrical contacting is difficult to ensure, in particular due to the very different material behavior of the metal wires compared to the flexibly or elastically deformable sensors or electrodes. In particular, when functional clothing equipped with corresponding sensors is put on or taken off or washed, there can be relatively strong deformations of the sensors, which can lead to the electrical contact being temporarily eliminated or torn off permanently.

The object of the invention is to avoid the disadvantages mentioned in a generic connection assembly and to ensure a stable and reliable electrical connection between the elastic sensor/electrode section and the at least one electrical inner conductor of the electrical conductor element.

This object is achieved by means of a connection assembly having the features of claim 1. In this case, a connecting device is provided which can be prestressed against the contact electrode in the contact region, with interposition of the inner conductor. Reliable electrical contacting can thereby be ensured also during or after a deformation of the elastic sensor/electrode section or an associated relative movement of the contact electrode thereof with respect to the electrical conductor element. The prestress generated by the connecting device ensures stable pressing of the electrical inner conductor against the contact electrode also during a deformation or reverse deformation of the elastic sensor/electrode section. In this way, a permanent electrical contact can be ensured and a loss of the electrical connection can be prevented.

It is especially preferred that the connecting device has a clamping device completely enclosing the sensor/electrode section at the level of the electrical contact region. Due to such an, in particular closed, all-round enclosing of the sensor/electrode section in the clamping device, the prestress generated by means of the connecting device can be predefined in terms of magnitude and permanently applied in the contact region.

Advantageously, the electrical inner conductor has a contact surface enlargement in the contact region, which enlargement is formed, for example, by a solder, a conductive adhesive, a metal direct-injection molding, a crimp contact, or another known and suitable contact surface enlargement. As a result, a certain tolerance compensation can take place, in particular during assembly, which can ensure especially reliable contacting between the electrical inner conductor and the contact electrode.

It is favorable if the elastic sensor/electrode section is formed by an at least partially flat, elastic sensor, such as a strain gauge and/or pressure sensor with at least one expandable and/or compressible dielectric elastomer, which is arranged between the contact electrode and at least one further electrode. This enables the flexible or elastic sensor/electrode section to be used on a flexible carrier material for capacitive determination of tensile and/or compressive stresses and/or for measuring accelerations or for detecting deformations, wherein the elastically deformable elastomer serves as a dielectric between the electrodes of the sensor. An especially exact capacitive determination of the desired measured values is thereby possible.

In a preferred embodiment, the elastic sensor has a printed circuit board connected to the contact electrode, whereby the connector assembly can be used with a wide variety of sensors. For example, in addition to detecting tensile and compressive stresses, the sensor can also be used to determine accelerations or speeds.

It is especially advantageous if the connecting device has an at least two-part housing with a first housing part and a second housing part, which can be combined, with interposition of the sensor/electrode section and the electrical inner conductor, as well as the generation of clamping forces in the contact region. The housing parts can be produced, for example, from a thermoset and/or an elastomer such as liquid silicone rubber (LSR). The at least two-part housing enables a simple and also subsequent enclosure of the flexible or elastic sensor/electrode section at the level of the electrical contact region. In addition, the two-part housing in this case can be easily matched in terms of size with the flexible or elastic sensor/electrode section in order to generate a desired contact pressure on the relevant contact electrode in the contact region with interposition of the electrical inner conductor. As an alternative to the two-piece housing, a one-piece housing is also possible, which can be produced in particular by overmolding the contact region, for example using a thermoset or an elastomer.

As an alternative or in addition thereto, the connecting device can have a heat-shrink tube which can be heat-shrunk about the sensor/electrode section at the level of the contact region, with interposition of the electrical inner conductor, in order to ensure a reliable connection between the electrical inner conductor and the contact electrode and also reliable electrical isolation of the contact region from the electrical shielding arranged outside of the heat-shrink tube.

In addition, it is favorable if the connecting device has a hold-down device at the level of the contact region, via which hold-down device the electrical inner conductor can be prestressed against the contact electrode. The hold-down device can be adapted to the shape of the relevant inner conductor and/or the relevant contact electrode in a special way in order to ensure reliable contacting. In particular when using the connecting device for differently shaped inner conductors and/or contact electrodes, they can be adapted to the respective contact region simply by using a correspondingly shaped hold-down device, without the connecting device as a whole or the housing thereof having to be adapted to the different shapes of the inner conductors and/or contact electrodes. In this way, the production costs of the connecting devices can be reduced for different connection assemblies.

Advantageously, the electrical inner conductor is connected to the hold-down device, wherein the hold-down device can, for example, be glued, injection-molded, or plugged on the inner conductor, or latched thereto or connected thereto in any other known and suitable manner. In this way, the inner conductor can be handled together with the hold-down device as a structural unit during assembly of the connection assembly, which simplifies assembly overall.

Furthermore, it is preferred if the electrical inner conductor has electrical conductor shielding, which is spaced apart from the contact region and which makes contact with electrical sensor shielding of the sensor/electrode section to form a first shielding contact region. In this way, the electrical contact region can be shielded against interfering electrical and/or magnetic fields in order to ensure interference-free signal acquisition, transmission, and processing. In addition, the environment and in particular a user of the connection assembly, who uses it on a functional item of clothing, for example, are shielded from the emitting fields or the electromagnetic waves at the same time.

The sensor shielding advantageously has two shielding electrodes which are arranged on two opposite sides of the contact electrode, wherein a shielding assembly is provided on the connecting device, which shields the contact region from the outside and electrically connects both shielding electrodes of the sensor shielding. In this way, especially reliable shielding of the contact electrode can be ensured.

In this case, it is favorable if the shielding assembly is retained on the housing, wherein it can be integrated, inserted, glued, or connected thereto in some other known and suitable manner. In particular, the shielding assembly can be formed by a corresponding material of the housing as a whole or by parts of the housing. For this purpose, the housing or the housing parts can be made of a conductive plastic or metal, for example, or form a molded interconnect device or mechatronic integrated device as a whole. As a result, when the housing is assembled, the shielding of the contact electrode is also produced at the same time by connecting the individual shielding parts, which considerably simplifies the assembly of the connection assembly.

In addition, if a heat-shrink tube is used, the shielding assembly can be provided outside of the heat-shrink tube to secure the electrical contact region. In this way, the heat-shrink tube ensures reliable electrical isolation between the contact region and the shielding assembly. For this purpose, the shielding assembly can, for example, be integrated into a housing or formed thereby, wherein this housing encloses the heat-shrink tube and is formed in one piece, for example. As an alternative thereto, the heat-shrink tube can, for example, be overmolded with a conductive material. In any case, an all-round shielding of the contact region can be guaranteed in this way.

In any case, it is favorable if the shielding assembly has a shielding element made of a conductive plastic, an injected metal, or a conductive paint, in order to adapt the shielding to the respective contours in the electrical contact region in a cost-effective manner.

In an especially preferred embodiment, the connecting device also has first strain relief means for the electrical conductor element. As a result, tensile forces that occur due to external mechanical stresses on the electrical conductor element or on the sensor can be absorbed independently of the contact region. Such tensile forces can occur, for example, during assembly of the connection assembly or when sewing it into a textile, or during the use thereof, such as, in particular, when a material equipped with the connection assembly, such as a piece of functional clothing, is worn, put on and taken off, or washed. Anything from damage or an increase in the contact resistance to complete tear-off of the contact in the contact region can be avoided by the forces discharged at the strain relief means.

It is favorable if the first strain relief means have deflection means or other baffles for absorbing tensile forces on the housing, such as a wrap-around dome. In this way, the electrical conductor element can be deflected at the deflection means or wound around the dome in order to dissipate any occurring tensile forces via the strain relief means on the housing. As an alternative or in addition thereto, the first strain relief means can also be formed by an adhesive connection between the electrical conductor element and the housing.

The first strain relief means advantageously have a first clamping body on the first housing part and a second clamping body on the second housing part, wherein it is possible for the clamping bodies to be placed against one another, with the formation of clamping forces on the electrical conductor element. In this way, when the housing is assembled, the clamping bodies are placed against one another with interposition of the conductor element, wherein it is clamped in position relative to the housing. If the conductor element is subsequently subjected to external tensile forces, they can be absorbed by the clamping bodies on the housing.

It is of particular advantage if the connecting device has second strain relief means for the sensor/electrode section in order to absorb the forces occurring thereon as a result of an external stress, independently of the first strain relief means. In this way, the second strain relief means can be adapted to the respective shape of the sensor/electrode section.

It is favorable in this case if the second strain relief means have a first sensor clamping body on the first housing part and a second sensor clamping body on the second housing part, which can be placed against one another with the formation of clamping forces on the sensor. In this way, when the housing is assembled, the sensor clamping bodies are placed against one another with interposition of the sensor, wherein it is clamped in position relative to the housing. If the sensor is subsequently subjected to external tensile forces, they can be absorbed by the clamping bodies on the housing. As an alternative or in addition thereto, the second strain relief means can also be formed by an adhesive connection between the sensor/electrode section and the housing.

Advantageously, the clamping bodies and/or sensor clamping bodies on the housing parts are produced in a 2-component process, such as by spraying or overmolding a first material component on a second material component. For example, the clamping bodies and/or sensor clamping bodies can be formed by the first material component, such as an elastomer or a liquid silicone rubber (LSR), which is injection-molded onto the housing part made from the second material component, wherein the second material component is made, for example, from a thermoset and/or metal. In any case, the material properties of the clamping bodies can be selected independently of the material properties of the housing to ensure stable clamping of the conductor element or sensor.

Furthermore, it is favorable if the connecting device is cast at least in regions, as a result of which the electrical contact region accommodated therein can be additionally stabilized and also sealed against the ingress of fluids, such as in particular liquids. In this way, the contact established between the sensor and the electrical conductor element can be additionally secured. In particular, this enables the connection assembly to be used on a textile material, such as in particular a functional item of clothing, in a machine-washable manner.

The connecting device is advantageously cast at least between the first strain relief means and the second strain relief means. This can prevent a constriction from occurring within the cast region as a result of a tensile load on the conductor element or on the sensor, which constriction opens up a leakage path between the cast material and the conductor element or sensor and thus leads to leakage.

In addition, it is favorable if the connecting device is accommodated in an in particular sealing casing, such as a silicone casing. For this purpose, the casing can be pulled over the connecting device in the finished state. As an alternative thereto, however, the connecting device can also be overmolded with the casing. In any case, the casing can achieve improved sealing of the contact region and greater shock resistance.

Advantageously, an injection-molded or mounted seal is also provided on the electrical conductor element to provide sealing with respect to the connecting device. In this way, sealing elements can be formed on the conductor element itself, which provide sealing with respect to the housing when the connection assembly is assembled.

Furthermore, the above-mentioned object is also achieved solely by a connecting device which is suitable for producing a connection assembly in one of the above-mentioned embodiments.

It should be noted that all features of the subject matter according to the invention described above can be replaced or combined with one another, provided that a replacement or a combination of same is not ruled out for technical reasons.

Figure 2:
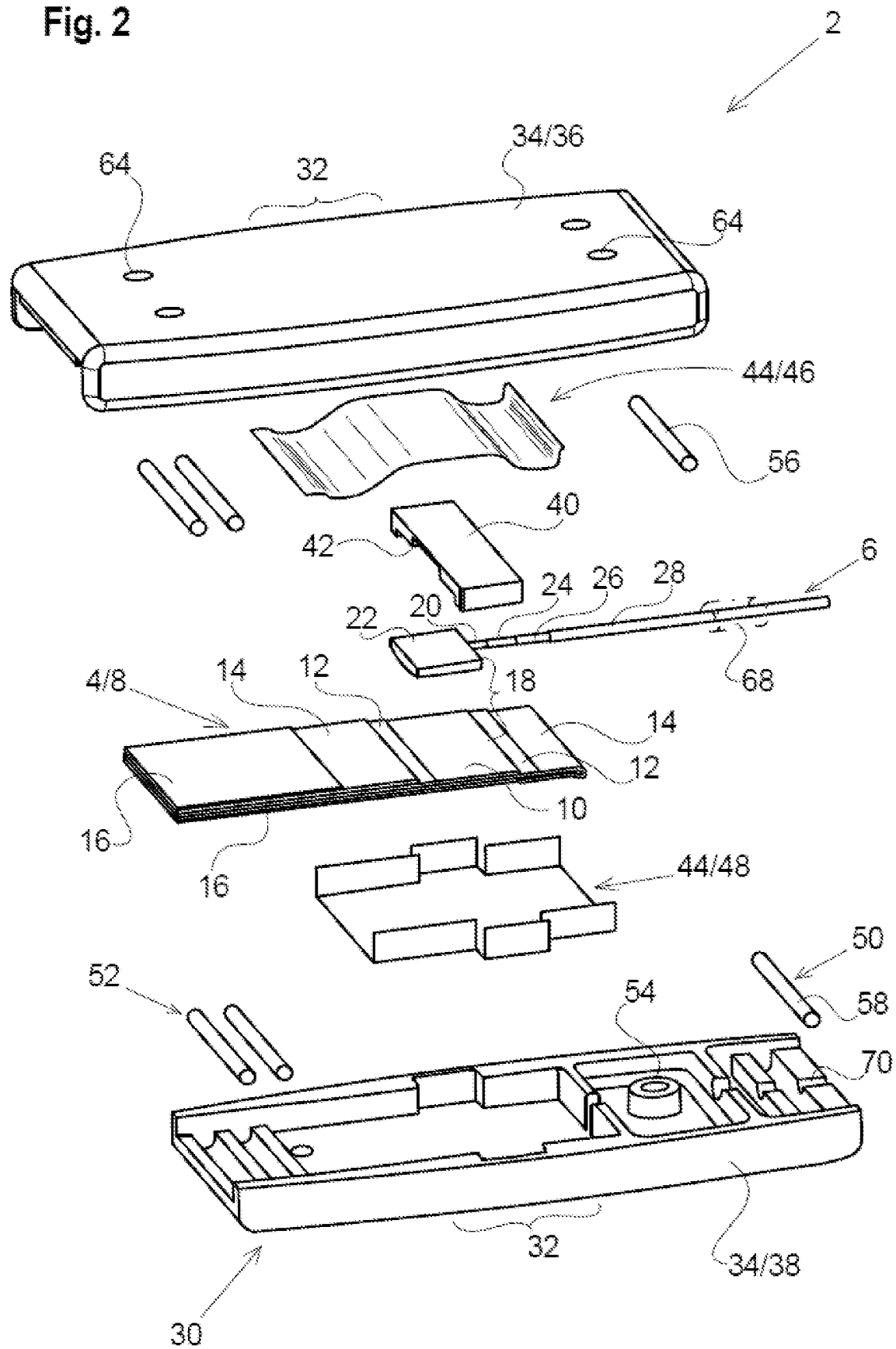
Figure 3:
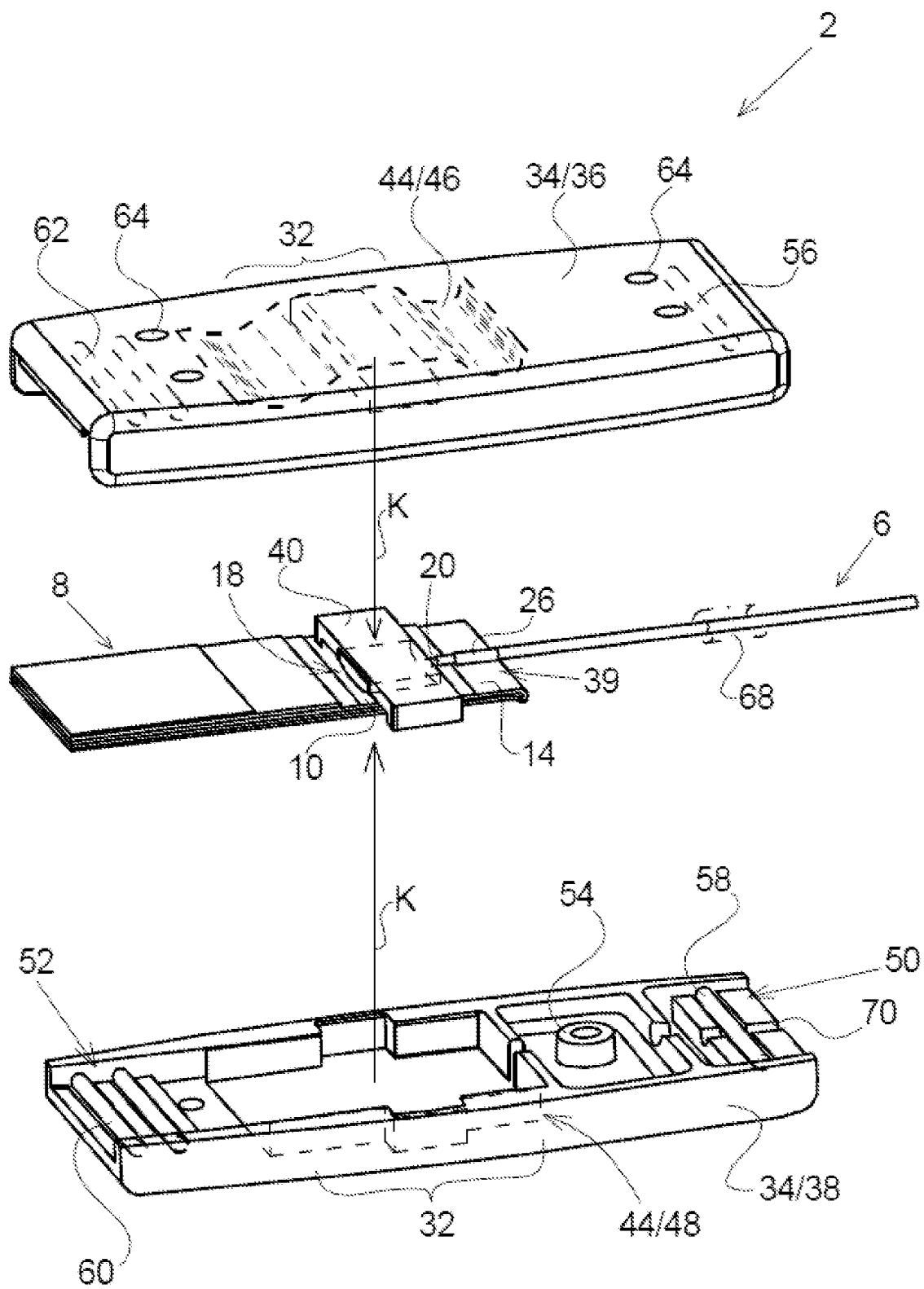
Figure 4:
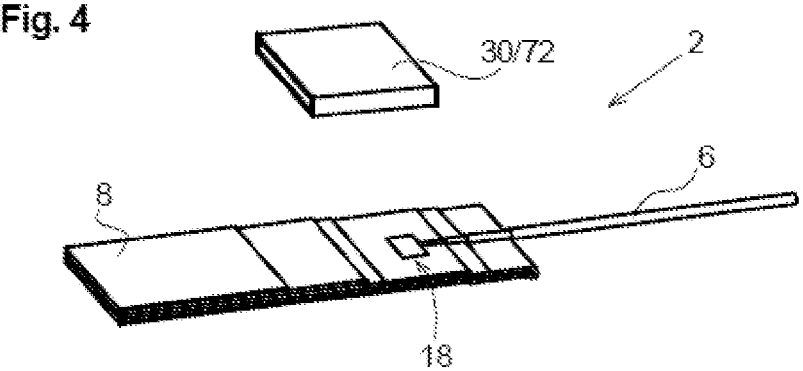
Figure 5:
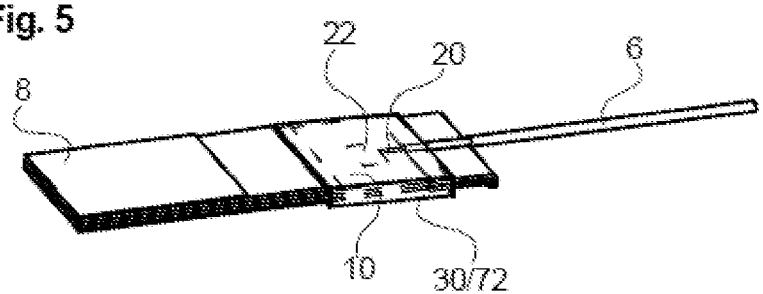
Figure 6:
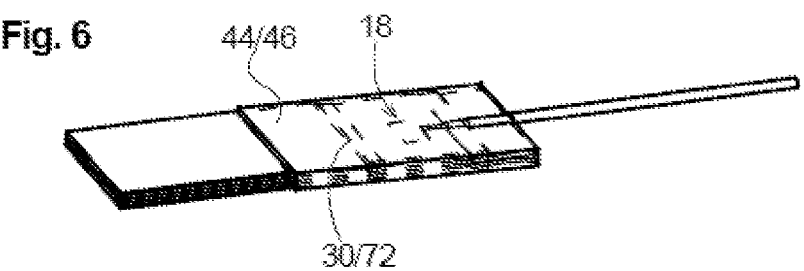
Figure 7:
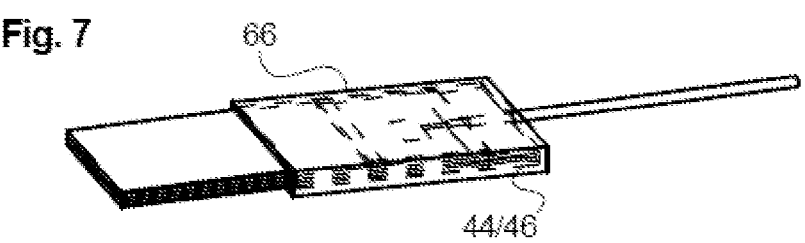

An exemplary embodiment of the invention is shown in the figures. The following is shown:

FIG. 1 a perspective view of a connection assembly according to the invention on a textile material;

FIG. 2 an exploded view of the connection assembly according to FIG. 1;

FIG. 3 an exploded view of the connection assembly according to FIG. 1 with contact established;

FIG. 4 a perspective view of an alternative embodiment of the connection assembly with a separate heat-shrink tube;

FIG. 5 a perspective view of the embodiment of the connection assembly according to FIG. 4 with the heat-shrink tube heat-shrunk;

FIG. 6 a perspective view of the embodiment of the connection assembly according to FIG. 5 with an additional shielding assembly;

FIG. 7 a perspective view of the embodiment of the connection assembly according to FIG. 6 with an additional casing; and FIG. 8 a perspective, exploded view of a further alternative embodiment of the connection assembly with a printed circuit board.

FIG. 1 shows a connection assembly 2 for the electrical and mechanical connection between a sensor 4 in the form of a dielectric elastomer sensor and at least one electrical conductor element 6 in the form of a cable, for example. The sensor 4 is used, for example, as a strain sensor, pressure sensor, and/or acceleration sensor. As an alternative to the cable shape shown, the electrical conductor element 6 can also be formed by a bus or a conducting track or one or more conductor wires or a conductive yarn that can be sewn.

As shown in FIG. 2, the sensor 4 is formed by a flexible or elastic sensor/electrode section 8 over its entire length or at least partially, which has a flexible or elastically deformable, flat layered composite. This layered composite has at least one conductor layer that acts as a contact electrode 10 and is arranged between two inner insulating layers 12.

As an alternative to the embodiment of the sensor 4 shown, the contact electrode 10 can also be part of a temperature control device, such as a heating element, which can be used, for example, to heat a piece of clothing, such as a glove or a sock (not shown). In this case, the conductor element 6 is used to supply the contact electrode 10 with the required heating current.

In the illustrated embodiment of the connection assembly 2 with the sensor 4, the insulating layers 12 isolate the contact electrode 10 from a respective shielding layer functioning as a shielding electrode 14, wherein both shielding electrodes 14, in turn, are arranged between the respective inner insulating layer 12 and an outer insulating layer 16.

The electrical conductor element 6 has an electrical inner conductor 20 which, for example, is provided with a contact region enlargement 22 at a free end. As shown, this can be formed by a conductive adhesive, an applied solder, a metal direct-injection molding, an insulation displacement connection, or a crimp contact and is used for better electrical contacting of the contact electrode 10 in a common electrical contact region 18.

The electrical conductor element 6 has conductor insulation 24 around the electrical inner conductor 20, which conductor insulation isolates the electrical inner conductor 20 from electrical conductor shielding 26. An insulating conductor jacket 28 is, in turn, provided around this conductor shielding 26.

Furthermore, the connection assembly 2 has a connecting device 30, which forms a clamping device 32, by means of which the elastic sensor/electrode section 8 can be encompassed all around at least at the level of the electrical contact region 18, in particular in a closed manner. For this purpose, the connecting device 30 has a two-part housing 34 with a first housing part 36 and a second housing part 38, which can be combined, with interposition of the sensor/electrode section 8 and the electrical inner conductor 20, wherein they generate clamping forces K in the contact region 18, as can be seen from FIG. 3.

In this case, the individual layers of both the elastic sensor/electrode section 8 as well as the electrical conductor element 6 are exposed in stages, as shown, such that the contact surface enlargement 22 of the electrical inner conductor 20 can be placed against the contact electrode 10 to form the electrical contact region 18 during assembly of the connection assembly 2 according to FIG. 3, while at the same time the conductor shielding 26 establishes contact with the shielding electrode 14, with the formation of a first shielding contact region 39.

In addition, the connecting device 30 has a hold-down device 40 which, when the housing 34 is assembled, presses against the electrical inner conductor 20 or the contact surface enlargement 22 thereof, thereby pretensioning it against the contact electrode 10, according to FIG. 3, at the level of the contact region 18. For this purpose, the hold-down device 40 is either formed in one piece with one of the two housing parts 36, 38 or can be inserted therein. In addition, the hold-down device 40 can be connected to the electrical inner conductor 20 for easier assembly. As shown in FIG. 2, the hold-down device 40 can have a receptacle 42 for this purpose, for example, for inserting or latching of the contact surface enlargement 22. As an alternative or in addition thereto, the electrical inner conductor 20 can also be glued or injection-molded onto the hold-down device 40, for example.

In addition, the connecting device 30 has a shielding assembly 44 which comprises a first shielding element 46 retained on the first housing part 36 and a second shielding element 48 retained on the second housing part 38. The shielding elements 46, 48 are formed in such a way that they shield the contact region 18 from the outside and individually or jointly electrically connect the two shielding electrodes 14 of the elastic sensor/electrode section 8 and the conductor shielding 26. The two shielding elements 46, 48 in this case can be integrated into the relevant housing part 36, 38, for example by forming a molded interconnect device or mechatronic integrated device. As an alternative thereto, the two shielding elements 46, 48 can be injected into the relevant housing part 36, 38, inserted in a removable manner, or glued in place.

For absorbing tensile forces which can be caused by external impacts on the electrical conductor element 6 and/or on the elastic sensor/electrode section 8, first strain relief means 50 for additional mechanical fixing of the electrical conductor element 6 and second strain relief means 52 for additional mechanical fixing of the elastic sensor/electrode section 8 are provided on the housing 34.

The first strain relief means 50 can have deflection means or other baffles for transferring tensile forces to the housing 34, such as a dome 54 around which the electrical conductor element 6 can be wrapped. Furthermore, the first strain relief means 50 comprise, for example, at least one first clamping body 56, which is retained on the first housing part 36, as well as at least one second clamping body 58, which is retained on the second housing part 38. These clamping bodies 56, 58 are placed against one another during assembly of the housing 34, with interposition of the electrical conductor element 6. As an alternative or in addition thereto, the first strain relief means 50 can also be formed by an adhesive connection between the electrical conductor element 6 and the housing 34 (not shown).

The second strain relief means 52 can likewise have at least one first sensor clamping body 60, which is retained on the first housing part 36, and at least one second sensor clamping body 62, which is retained on the second housing part 38, which are placed against one another, with interposition of the elastic sensor/electrode section, during assembly of the housing 34. As an alternative or in addition thereto, the second strain relief means 52 can also be formed by an adhesive connection between the sensor/electrode section 8 and the housing 34 (not shown).

Both the clamping bodies 56, 58 and the sensor clamping bodies 60, 62 can be formed from a material that is different from that of the housing 34, such as an elastomer, such as in particular LSR. For this purpose, the housing 34 with the clamping bodies 56, 58 and sensor clamping bodies 60, 62 can be produced, for example, in a 2-component process. For example, a first material component for producing the clamping bodies 56, 58 and/or sensor clamping bodies 60, 62 can be injection-molded onto the housing parts 36, 38, which housing is made of the second material component, or vice versa. As an alternative thereto, the clamping bodies 56, 58 and/or sensor clamping bodies 60, 62 can also be formed, at least partially, as shown, by parts which are produced separately and which can be inserted into the housing parts 36, 38.

In order to reliably seal the connection assembly 2 and in particular the electrical contact region 18 from the outside, the connecting device 30 can also be cast at least between the first strain relief means 50 and the second strain relief means 52. For this purpose, the housing 34 has casting openings 64, through which a corresponding curing or cross-linking casting material, such as silicone, can be introduced.

As an alternative or in addition to this seal, the connecting device 30 can also be accommodated in a casing or an overmolding of the housing 34 (not shown). Moreover, an additional seal 68 can also be injection-molded or mounted on the at least one electrical conductor element 6, which seal seals off a corresponding entry opening 70 of the connecting device 30 during assembly of the housing 34.

FIG. 4 shows an alternative embodiment of the connection assembly 2 in which the connecting device 30 is formed by a heat-shrink tube 72. This tube is shrunk on the elastic sensor/electrode section 8 in the electrical contact region 18, with interposition of the electrical conductor 6, as can be seen from FIG. 5. As a result, the electrical inner conductor 20 or the contact surface enlargement 22 thereof is retained on the contact electrode 10 at least during assembly and is prestressed against said contact electrode, for example, by being overmolded with a plastic. In order to improve the electrical contacting and/or to shield the contact region in a targeted manner, the heat-shrink tube 72 itself can also be electrically conductive, at least in sections.

In order to electrically shield the contact region 18, the shielding assembly 44 according to FIG. 6 can be provided outside the heat-shrink tube 72 in this embodiment. The shielding assembly 44 can have, for example, a conductive plastic part, a metal part injected into a plastic part, or a conductive lacquer of a housing part as the shielding element 46. In any case, the heat-shrink tube 72 ensures reliable electrical isolation of the contact region 18 from the shielding assembly 44.

In order to achieve additional sealing of the contact region 18 fixed by the heat-shrink tube 72, an additional casing 66 can be provided on this region, as shown in FIG. 7. The casing 66 can be produced, for example, by overmolding with a sealing material such as silicone.

FIG. 8 shows a further embodiment of the connection assembly 2, in which the electrical contact region 18 is produced using a printed circuit board 76 (PCB) on which a sensor contact region 78 is provided for contacting of the elastic sensor/electrode section 8 and a conductor contact region 80 is provided for contacting of the electrical conductor element 6. As an example, the conductor element 6 is shown here as a two-wire textile ribbon cable which can be fastened, via two fixing openings 82, to two domes of the housing 34 serving as the first strain relief means 50. The printed circuit board 76 is used to accommodate electronics 84, which can include, for example, another sensor, such as an acceleration sensor, or a switch.

Regardless of the embodiment, the connection assembly 2, as shown in FIG. 1, can be used, for example, on a textile material T such as an item of clothing, a pair of underwear, a decorative fabric, or a curtain, and can thereby fulfill various functions. For example, the respective sensor system can serve to monitor bodily functions of a user or to determine specific material loads. In this case, the connection assembly 2 can be used in the manner of a switch for transmitting a signal as a function of a detection of a certain loading or stress that occurs on the textile carrier material.

It should be noted that all previously described elements and features of the various embodiments of the subject matter according to the invention can be replaced or combined with one another, provided that a replacement or a combination of same is not ruled out for technical reasons.

The invention claimed is:

1. A connection assembly for the electrical and mechanical connection between a contact electrode and an electrical conductor element, comprising:
    a flexible sensor/electrode section, in which the contact electrode is at least partially arranged;
    at least one electrical inner conductor of the electrical conductor element for applying and/or picking off an electrical voltage and/or capacitive change at the contact electrode; and
    an electrical contact region in which the at least one electrical inner conductor makes electrical contact with the contact electrode,
    wherein a connecting device is provided which can be biased against the contact electrode in the contact region, with interposition of the inner conductor.

2. The connection assembly according to claim 1, wherein the electrical inner conductor has a contact surface enlargement in the contact region.

3. The connection assembly according to claim 1, wherein the connecting device has an at least two-part housing with a first housing part and a second housing part, which can be assembled, with interposition of the sensor/electrode section and the electrical inner conductor, as well as generation of clamping forces in the contact region.

4. The connection assembly according to claim 1, wherein the connecting device is accommodated in a jacket.

5. The connection assembly according to claim 1, wherein an injection-molded or mounted seal for sealing against the connecting device is provided at the electrical conductor element.

6. The connection assembly according to claim 1, wherein the flexible sensor/electrode section is formed by an at least partially flat, elastic sensor with at least one dielectric elastomer, which is arranged between the contact electrode and at least one further electrode.

7. The connection assembly according to claim 6, wherein the elastic sensor has a printed circuit board connected to the contact electrode.

8. The connection assembly according to claim 1, wherein the connecting device has a clamping unit enclosing the sensor/electrode section at the level of the electrical contact region.

9. The connection assembly according to claim 8, wherein the connecting device has a heat-shrink tube which can be heat-shrunk about the sensor/electrode section at the level of the electrical contact region, with interposition of the electrical inner conductor.

10. The connection assembly according to claim 8, wherein the connecting device has a hold-down device at the level of the contact region, via which hold-down device the electrical inner conductor can be biased against the contact electrode, wherein the electrical inner conductor is connected to the hold-down device.

11. The connection assembly according to claim 1, wherein the electrical inner conductor has electrical conductor shielding, which is spaced apart from the contact region and which makes contact with electrical sensor shielding of the sensor/electrode section to form a shielding contact region spaced apart from the contact region.

12. The connection assembly according to claim 11, wherein the sensor shielding has two shielding electrodes which are arranged on two opposite sides of the contact electrode, wherein a shielding assembly is provided at the connecting device which shields the contact region from the outside and electrically connects both shielding electrodes of the sensor shielding.

13. The connection assembly according to claim 12, wherein the shielding assembly is retained at the housing and has a shielding element which is made of a conductive plastic, an injected metal, or a conductive lacquer.

14. The connection assembly according to claim 13, wherein the shielding assembly is provided outside the heat-shrink tube.

15. The connection assembly according to claim 1, wherein the connecting device has first strain relief means for the electrical conductor element.

16. The connection assembly according to claim 15, wherein the first strain relief means have deflection means, including a wrap-around dome, and/or have a first clamping body at the first housing part and a second clamping body at the second housing part, which can be placed against one another, with the formation of clamping forces on the electrical conductor element.

17. The connection assembly according to claim 16, wherein the clamping bodies and/or sensor clamping bodies at the housing parts are produced in a 2-component process.

18. The connection assembly according to claim 16, wherein the connecting device has second strain relief means for the sensor/electrode section, which have a first sensor clamping body at the first housing part and a second sensor clamping body at the second housing part, which can be placed against one another, with the formation of clamping forces on the sensor.

19. The connection assembly according to claim 18, wherein the connecting device is cast at least in sections, between the first strain relief means and the second strain relief means.

* * * * *